(12) United States Patent
Murali et al.

(10) Patent No.: US 9,068,882 B2
(45) Date of Patent: Jun. 30, 2015

(54) LOW POWER THERMAL IMAGER

(71) Applicant: International Business Machines Corporation, Armonk, NY (US)

(72) Inventors: Kota V R M Murali, Bangalore (IN); Karthik Venkataraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 13/915,417

(22) Filed: Jun. 11, 2013

(65) Prior Publication Data

US 2014/0361397 A1    Dec. 11, 2014

(51) Int. Cl.
H01L 27/22     (2006.01)
H01L 27/146    (2006.01)
H01L 43/12     (2006.01)
G01J 5/08      (2006.01)

(52) U.S. Cl.
CPC ..................... *G01J 5/0853* (2013.01)

(58) Field of Classification Search
CPC ... H01L 27/17; H01L 27/14692; H01L 29/82; H01L 27/22; H01L 27/146; H01L 43/12
See application file for complete search history.

(56) References Cited

U.S. PATENT DOCUMENTS

| | | | |
|---|---|---|---|
| 5,232,286 A | 8/1993 | Dubreuil et al. | |
| 5,909,004 A | 6/1999 | Hedengren et al. | |
| 6,710,343 B2 | 3/2004 | Wood et al. | |
| 7,372,722 B2 * | 5/2008 | Jeong et al. | 365/158 |
| 7,501,636 B1 * | 3/2009 | Son et al. | 250/370.14 |
| 7,764,136 B2 * | 7/2010 | Suzuki et al. | 331/107 SL |
| 2003/0001094 A1 * | 1/2003 | Katagiri et al. | 250/336.2 |
| 2006/0176735 A1 * | 8/2006 | Yuasa | 365/173 |
| 2007/0034800 A1 | 2/2007 | Huang | |
| 2008/0197285 A1 * | 8/2008 | Frey et al. | 250/336.2 |
| 2008/0247072 A1 * | 10/2008 | Nozieres et al. | 360/59 |
| 2008/0272302 A1 * | 11/2008 | Frey et al. | 250/336.2 |
| 2009/0290614 A1 | 11/2009 | Gregory et al. | |
| 2010/0148067 A1 | 6/2010 | Cheon et al. | |
| 2010/0181485 A1 | 7/2010 | Legras | |
| 2011/0062333 A1 * | 3/2011 | Ben-Bassat | 250/332 |
| 2011/0062334 A1 * | 3/2011 | Ben-Bassat | 250/332 |
| 2011/0062336 A1 | 3/2011 | Ben-Bassat | |
| 2011/0152703 A1 * | 6/2011 | Zuckerman et al. | 600/508 |
| 2011/0227179 A1 * | 9/2011 | Kitagawa et al. | 257/421 |

(Continued)

OTHER PUBLICATIONS

Walter et al., "Seebeck effect in magnetic tunnel junctions," Oct. 2011, pp. 742-746, Nature Materials, vol. 10.

*Primary Examiner* — Minh-Loan Tran
*Assistant Examiner* — Fazli Erdem
(74) *Attorney, Agent, or Firm* — Michael J. LeStrange; Hoffman Warnick LLC

(57) ABSTRACT

A low power thermal imager is disclosed. In one embodiment, the thermal imager comprises a cross-bar architecture having a plurality of horizontal lines each arranged in a row, a plurality of vertical lines each arranged in a column, and a plurality of cross-points each formed at an intersection between one of the plurality of horizontal lines and one of the plurality of vertical lines; and a plurality of tunnel junction structures each located at one of the plurality cross-points, each tunnel junction structure including a first metal layer disposed over one of the plurality of vertical lines, an insulator layer disposed over the first metal layer, and a second metal layer disposed over the insulator layer and underneath one of the plurality of horizontal lines.

18 Claims, 4 Drawing Sheets

(56) References Cited

U.S. PATENT DOCUMENTS

| | | | |
|---|---|---|---|
| 2011/0254959 A1* | 10/2011 | Seppa et al. | 348/164 |
| 2012/0008383 A1* | 1/2012 | Gapihan et al. | 365/173 |
| 2012/0025079 A1 | 2/2012 | Raulerson et al. | |
| 2012/0037805 A1* | 2/2012 | Dupont et al. | 250/349 |
| 2012/0205761 A1* | 8/2012 | Ranjan et al. | 257/421 |
| 2014/0166885 A1* | 6/2014 | Arndt et al. | 250/349 |
| 2014/0269035 A1* | 9/2014 | Manipatruni et al. | 365/158 |
| 2014/0273284 A1* | 9/2014 | Annunziata | 438/3 |
| 2014/0321501 A1* | 10/2014 | Bartonek et al. | 374/121 |
| 2014/0328116 A1* | 11/2014 | Guo | 365/158 |
| 2014/0356979 A1* | 12/2014 | Annunziata et al. | 438/3 |

* cited by examiner

LOW POWER THERMAL IMAGER

BACKGROUND

The disclosure relates generally to thermal imagers, and more particularly, to a low power thermal imager for integrated circuits with vertical tunnel junctions and modulated metal/insulator interface conditions.

Radiation sensors mainly in infrared (IR) and terahertz energy regions have been shown to be important for practical applications such as thermal sensors/imagers, body scans for security purposes, etc. There are different types of thermal detectors in the market such as pyroelectric detectors, thermoelectric detectors, or bolometer detectors. Pyroelectric detectors works efficiently only at higher temperatures (e.g., >300° C.) by measuring the wavelength of the IR assuming a black body radiation. Standard thermoelectric detectors using active matrix structure cannot be envisioned and will have electronic noise. Bolometer detectors work due to change in resistance with heat/temperature with respect to a heat reservoir. Currently, there is a dearth of low power sensitive radiation sensors.

BRIEF SUMMARY

A first aspect of the disclosure provides a thermal imager. In this embodiment, the thermal imager comprises a cross-bar architecture having a plurality of horizontal lines each arranged in a row, a plurality of vertical lines each arranged in a column, and a plurality of cross-points each formed at an intersection between one of the plurality of horizontal lines and one of the plurality of vertical lines; and a plurality of tunnel junction structures each located at one of the plurality of cross-points, each tunnel junction structure including a first metal layer disposed over one of the plurality of vertical lines, an insulator layer disposed over the first metal layer, and a second metal layer disposed over the insulator layer and underneath one of the plurality of horizontal lines.

A second aspect of the disclosure provides a method. In this embodiment, the method comprises forming a cross-bar architecture having a plurality of horizontal lines each arranged in a row, a plurality of vertical lines each arranged in a column, and a plurality of cross-points each formed at an intersection between one of the plurality of horizontal lines and one of the plurality of vertical lines; and forming a plurality of tunnel junction structures each located at one of the plurality of cross-points, each tunnel junction structure including a first metal layer disposed over one of the plurality of vertical lines, an insulator layer disposed over the first metal layer, and a second metal layer disposed over the insulator layer and underneath one of the plurality of horizontal lines.

BRIEF DESCRIPTION OF THE DRAWINGS

The above and other aspects, features and advantages of the disclosure will be better understood by reading the following more particular description of the disclosure in conjunction with the accompanying drawings.

Figure 1:
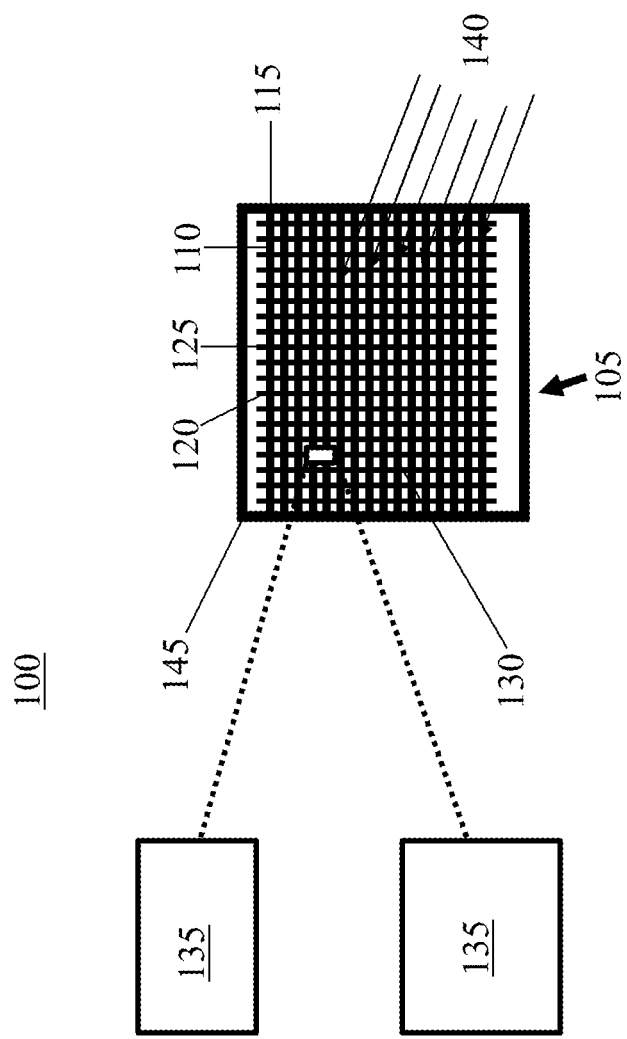
FIG. 1 shows a schematic diagram of a thermal imager in a cross-bar architecture according to one embodiment of the present invention.

The drawings are not necessarily to scale. The drawings are merely schematic representations, not intended to portray specific parameters of the disclosure. The drawings are intended to depict only typical embodiments of the disclosure, and therefore should not be considered as limiting the scope of the disclosure. In the drawings, like numbering represents like elements.

DETAILED DESCRIPTION

Turning to the drawings, FIG. 1 shows a schematic diagram of a thermal imager 100 in a cross-bar architecture 105 according to one embodiment of the present invention. As shown in FIG. 1, cross-bar architecture 105 has a plurality of horizontal lines 110 each arranged in a row 115 and a plurality of vertical lines 120 each arranged in a column 125. In one embodiment, horizontal lines 110 can be word lines, while vertical lines 120 can be bit lines. A plurality of cross-points 130 are formed at each intersection between one of the horizontal lines 110 and one of the vertical lines 120. Tunnel junction structures 135 are located at each one of the cross-points 130. For clarity, FIG. 1 only schematically illustrates two tunnel junction structures 135, however, each cross-point 130 in cross-bar architecture 105 could have a tunnel junction structure associated thereat. In operation, radiant energy 140 would be directed at thermal imager 100. Radiant energy 140 that impinges on tunnel junction structures 135 in thermal imager 100 will generate a signal that is indicative of the local thermal state of the junction device. In particular, the signal is represented in terms of a voltage that is developed across the tunnel junction structures and is converted or calibrated to the local thermal state. As shown in FIG. 1, thermal imager 100 further includes a heat sink 145 disposed on the periphery and back-plane of cross-bar architecture 105 that serves to dissipate heat from the thermal imager that is due to radiant energy 140.

Figure 2:
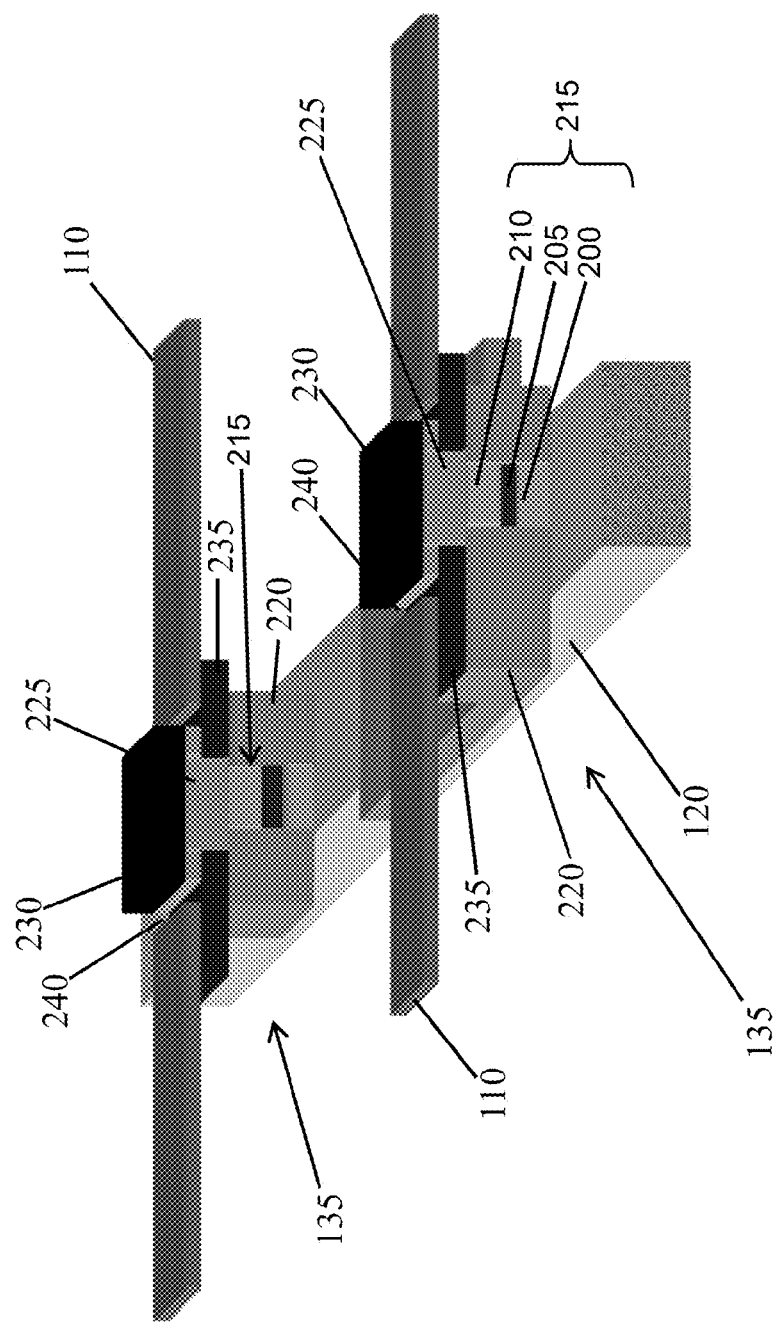
FIG. 2 shows a more detailed perspective view of two tunnel junction structures schematically depicted in FIG. 1 according to one embodiment of the present invention.
Figure 3:
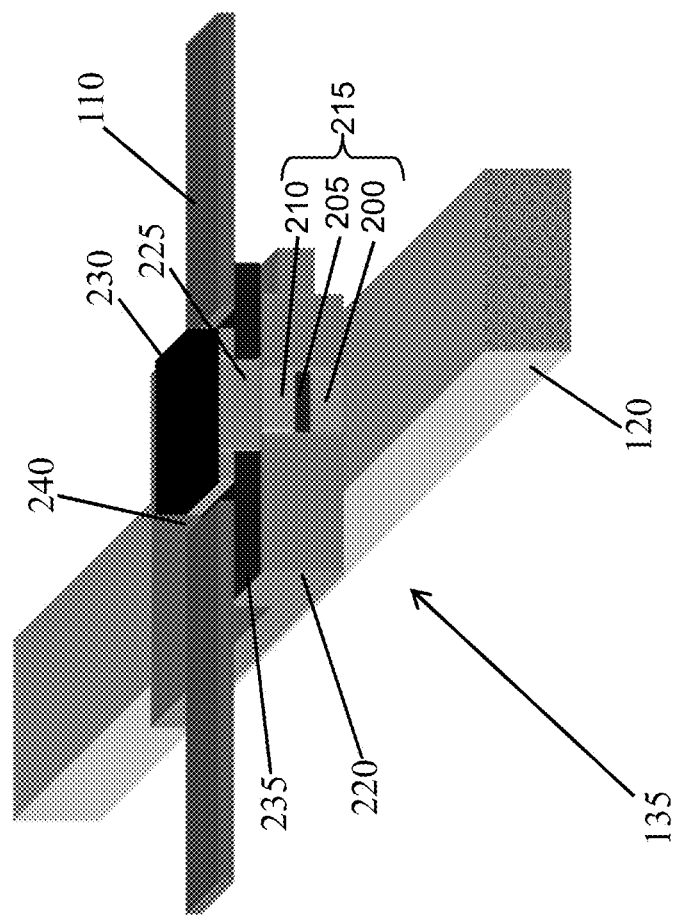
FIG. 3 shows a perspective view of one tunnel junction structure according to one embodiment of the present invention.
Figure 4:
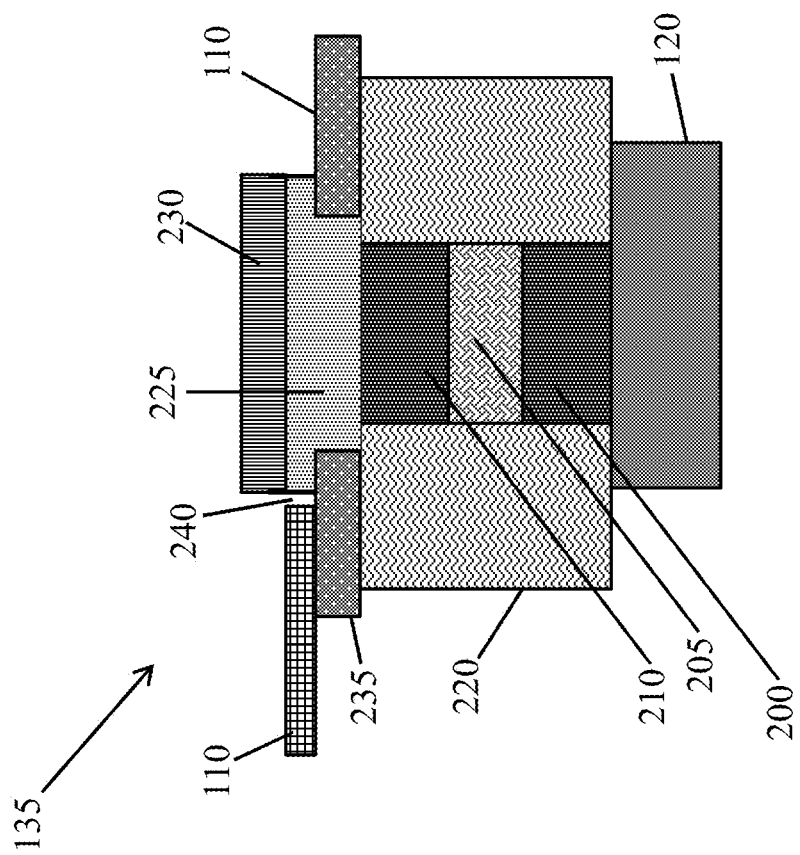
FIG. 4 shows a cross-sectional perspective view of one tunnel junction structure according to one embodiment of the present invention.

FIGS. 2-4 show a more detailed view of a tunnel junction structure 135 according to embodiments of the present invention. In particular, FIG. 2 shows a more detailed perspective view of the two tunnel junction structures 135 schematically depicted in FIG. 1, while FIGS. 3-4 show a perspective view and cross-sectional view, respectively of only one tunnel junction structure. The description that follows is applicable to each representation illustrated in FIGS. 2-4. As shown in FIGS. 2-4, each tunnel junction structure 135 is positioned between a horizontal line 110 and a vertical line 120. In one embodiment, horizontal lines 110 and vertical lines 120 can be an electrically conducting metal with a negligible Seebeck coefficient. Examples of an electrically conducting metal with a negligible Seebeck coefficient can include, but are not limited to, Aluminum, Copper, Gold, Tantalum, Platinum or alloys of these.

Each tunnel junction structure 135 includes a first metal layer 200 disposed over one of the vertical lines 120. An insulator layer 205 is disposed over the first metal layer 200 and a second metal layer 210 is disposed over the insulator layer and underneath one of the horizontal lines 110. First metal layer 200, insulator layer 205, and second metal layer 210 form a vertical tri-layer tunnel junction 215. The tri-layer tunnel junction 215 formed by first metal layer 200, insulator layer 205 and second metal layer 210 can be grown and fabricated using well-known MRAM technology. For example, in one embodiment, the tri-layer tunnel junction 215 can be grown in an epitaxial, polycrystalline or amorphous phase. In one embodiment, material for first metal layer 200 and second metal layer 210 can be selected from the group consisting of transition metals or alloys having at least one element that is a transition metal. Illustrative, but non-limiting examples of materials that can be used as material for first metal layer 200 and second metal layer 210 are transition metals containing oxides and transition metals containing sulphides. In one embodiment, insulator layer 205 can be any insulator material or semiconductor material with a large band gap (e.g., greater than 2 eV). Illustrative, but non-limiting examples of material that can be used for insulator layer 205 include any metal oxide such as $TiO_2$, MgO, and $Al_2O_3$. In one embodiment, the tri-layer tunnel junction 215 formed by first metal layer 200, insulator layer 205 and second metal layer 210 can be selected from the group consisting of CoF/MgO/CoFe and CoFeB/MgO/CoFeB.

Furthermore, in one embodiment, the tri-layer tunnel junction 215 can have an aspect ratio between the first metal layer 200 and the second metal layer 210 that is greater than 1. An aspect ratio between the first metal layer 200 and the second metal layer 210 that is greater than 1 enables a larger flux of heat dissipated from the first metal layer 200 to the heat sink 145, providing a larger temperature gradient in the vertical direction of the tri-layer tunnel junction 215. This enables higher sensitivity of the thermal imager 100.

In operation, each tri-layer tunnel junction 215 in the thermal imager 100 serves as a thermoelectric device that detects radiant energy that strikes the cross-bar architecture 105 of the imager. By having tri-layer tunnel junction 215 formed from first metal layer 200, insulator layer 205 and second metal layer 210, the interface hybridization that results from having metal deposited against an insulator can be tuned or modulated to obtain a large Seebeck Coefficient. As used herein, a large Seebeck coefficient may be described as having values with its magnitude equal to or more than 15 µV/K. A large Seebeck Coefficient enables a large temperature gradient to be obtained between first metal layer 200 and second metal layer 210. This allows a voltage to be easily read out for a given temperature change.

In one embodiment, a large Seebeck Coefficient for tri-layer tunnel junction 215 can be obtained by tuning or modulating film thickness and junction area of first metal layer 200, insulator layer 205 and second metal layer 210 to produce a resistance that ensures higher signal to noise ratio. In this manner, the resistance of the tri-layer tunnel junction 215 can be made much larger than the resistance of the horizontal word lines 110 or the vertical bit lines 120, and thus noise from the interconnects with these lines through each interface of the junction 215 will be low. Consequently, this configuration prevents the formation of any Seebeck effect from arising that is due to the horizontal word lines 110 or the vertical bit lines 120.

Referring back to FIGS. 2-4, each tunnel junction structure 135 further includes an inter-layer thermally insulating dielectric layer 220 disposed against each side of the tunnel junction structure extending from the first metal layer 200, past insulator layer 205, up to the second metal layer 210. In this configuration, inter-layer thermally insulating dielectric layer 220 serves to confine the heat flow in the vertical tri-layer junction 215 and also in reducing the heat exchange between two nearby cross-point tunnel structures 135. This ensures higher resolution capability of the thermal imager. Illustrative, but non-limiting examples of material that can be used as inter-layer thermally insulating dielectric layer 215 can include $TiO_2$, $WSe_2$ and other compounds exhibiting very low thermal conductivity.

Each tunnel junction structure 135 further includes an electrically conducting metal layer 225 disposed over the second metal layer 210 In one embodiment, electrically conducting metal layer 225 can be an electrically conducting metal with a negligible Seebeck coefficient. In this configuration, electrically conducting metal layer 225 serves to efficiently conduct/transport heat absorbed by the heat absorbing layer 230 to the active device element 215. Examples of an electrically conducting metal with a negligible Seebeck coefficient can include, but are not limited to, Aluminum, Copper, Gold, Tantalum, Platinum or alloys of these.

As shown in FIGS. 2-4, each tunnel junction structure 135 further includes a heat absorbing layer or cap layer 230 disposed over the electrically conducting metal layer 225 and over a portion of one of the horizontal lines 110. In this configuration, heat absorbing layer 230 serves to efficiently absorb the radiation 140 required to cause the required vertical temperature gradient in the active device element 215. In one embodiment, heat absorbing layer 230 can be any radiation absorbing layer. Examples of a radiation absorbing layer can include, but are not limited to: carbon and graphite.

Each tunnel junction structure 135 further includes a thermally insulating and electrically conducting layer or barrier layer 235 disposed against each side of the electrically conducting metal layer 225 and disposed underneath a portion of one of the plurality of horizontal lines 110. A purpose of the thermally insulating and electrically conducting layer 235 is to provide good electrical contact to metal layer 210 when tri-layer junction 215 is active with minimum heat conduction loss. In one embodiment, the thermally insulating and electrically conducting layer 235 can be selected from the group consisting of low conductivity oxides, fiber glass, and conducting polymers such as Polyacetylene doped cations.

As shown in FIGS. 2-4, a gap 240 separates electrically conducting metal layer 225 and heat absorbing layer 230 in each tunnel junction structure 135 from horizontal line 110. This gap 240 extends up from a top surface of thermally insulating and electrically conducting layer 235 above horizontal line 110, separating portions of line 110 that are proximate to the heat absorbing layer 230. Gap 240 serves to facilitate an efficient heat transfer of radiation between heat absorbing layer 230 and electrically conducting metal layer 225. It is not desirable to have heat distributed across the structure, hence the use of thermally insulating and electrically conducting layer 235.

The tunnel junction structure 135 in the manner described above makes the thermal imager 100 with cross-bar architecture 105 suitable for use as a low power thermal imager. In particular, since the signal generated from the tunnel junction structure is represented in terms of voltage developed across the tri-layer tunnel junction 215, which can be tuned to have considerable resistance, there will be no or very small current flow. This results in low power loss in tunnel junction structure 135 and an overall thermal imager 100 that has low power loss. As used herein, low power loss is referred to as very low leakage currents (preferably less than 100 pico Amp) within the cross-bar architecture 105 encountered during sensing voltage signal across each cross-point device 135. Having the thermal imager 100 with cross-bar architecture 105 with low power loss makes its suitable for a variety of applications. For example, the thermal imager 100 with cross-bar architecture 105 can be used in an integrated active thermal stress analysis that uses active matrix element devices such as LED displays. In this manner, probing/testing for device failure/degradation can be determined faster in real-time. In another application, the thermal imager 100 with cross-bar architecture 105 can be used to extend bolometer-based detector devices to non-metallic systems. In this manner, a new formalism in building thermal imagers and scanners with lower noise and better sensitivity comparable to standard thermocouple based sensors can be obtained.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A thermal imager, comprising:
   a cross-bar architecture having a plurality of horizontal lines each arranged in a row, a plurality of vertical lines each arranged in a column, and a plurality of cross-points each formed at an intersection between one of the plurality of horizontal lines and one of the plurality of vertical lines; and
   a plurality of tunnel junction structures each located at one of the plurality of crosspoints, each tunnel junction structure including a first metal layer disposed over one of the plurality of vertical lines, an insulator layer disposed over the first metal layer, and a second metal layer disposed over the insulator layer and underneath one of the plurality of horizontal lines;
   wherein each tunnel junction structure further includes an inter-layer thermally insulating dielectric layer disposed against each side of the tunnel junction structure extending from the first metal layer up to the second metal layer.

2. The thermal imager according to claim 1, wherein the insulator layer comprises a metal oxide.

3. The thermal imager according to claim 1, wherein the first metal layer and the second metal layer is selected from the group consisting of transition metals and alloys having at least one element that is a transition metal.

4. The thermal imager according to claim 1, wherein the first metal layer, the insulating layer, and the second metal layer of each tunnel junction structure is selected from the group consisting of CoFe/MgO/CoFe and CoFeB/MgO/CoFeB.

5. The thermal imager according to claim 1, wherein the inter-layer thermally insulating dielectric layer includes $TiO_2$ and $WSe_2$.

6. The thermal imager according to claim 1, wherein each tunnel junction structure further includes an electrically conducting metal layer disposed over the second metal layer.

7. The thermal imager according to claim 6, wherein each tunnel junction structure further includes a heat absorbing layer material disposed over the electrically conducting metal layer and over a portion of one of the plurality of horizontal lines.

8. The thermal imager according to claim 7, wherein remaining portions of the one of the plurality of horizontal lines are separated from the heat absorbing layer material by a gap.

9. The thermal imager according to claim 6, wherein each tunnel junction structure further includes a thermally insulating and electrically conducting material layer disposed against each side of the electrically conducting metal layer, and disposed underneath a portion of one of the plurality of horizontal lines.

10. The thermal imager according to claim 9, wherein the thermally insulating and electrically conducting material layer is selected from the group consisting of oxides, fiber glass, and conducting polymers.

11. The thermal imager according to claim 1, further comprising a heat sink disposed on a periphery and back-plane of the cross-bar architecture.

12. The thermal imager according to claim 1, wherein an aspect ratio between the first metal layer and the second metal layer for each tunnel junction structure is greater than 1.

13. A method, comprising:
    forming a cross-bar architecture having a plurality of horizontal lines each arranged in a row, a plurality of vertical lines each arranged in a column, and a plurality of cross-points each formed at an intersection between one of the plurality of horizontal lines and one of the plurality of vertical lines;
    forming a plurality of tunnel junction structures each located at one of the plurality of cross-points, each tunnel junction structure including a first metal layer disposed over one of the plurality of vertical lines, an insulator layer disposed over the first metal layer, and a second metal layer disposed over the insulator layer and underneath one of the plurality of horizontal lines; and
    forming an inter-layer thermally insulating dielectric layer against each side of the tunnel junction structure extending from the first metal layer UP to the second metal layer.

14. The method according to claim 13, wherein the forming of the plurality of tunnel junction structures includes growing each layer in the tunnel junction structures in epitaxial, polycrystalline or amorphous phase.

15. The method according to claim 13, wherein each tunnel junction structure further includes an electrically conducting metal layer disposed over the second metal layer.

16. The method according to claim 15, wherein each tunnel junction structure further includes a heat absorbing layer material disposed over the electrically conducting metal layer and over a portion of one of the plurality of horizontal lines.

17. The method according to claim 15, wherein each tunnel junction structure further includes a thermally insulating and electrically conducting material layer disposed against each side of the electrically conducting metal layer and disposed underneath a portion of one of the plurality of horizontal lines.

18. The method according to claim 15, further comprising disposing a heat sink about a periphery and back-plane of the cross-bar architecture.

* * * * *